(12) United States Patent
Kiser

(10) Patent No.: US 8,603,389 B2
(45) Date of Patent: Dec. 10, 2013

(54) COATED WELDING ELECTRODE HAVING RESISTANCE TO DUCTILITY DIP CRACKING, AND WELD DEPOSIT PRODUCED THEREFROM

(75) Inventor: Samuel D. Kiser, Lenoir, NC (US)

(73) Assignee: Huntington Alloys Corporation, Huntington, WV (US)

( * ) Notice: Subject to any disclaimer, the term of this patent is extended or adjusted under 35 U.S.C. 154(b) by 1346 days.

(21) Appl. No.: 11/814,244

(22) PCT Filed: Jan. 25, 2006

(86) PCT No.: PCT/US2006/002522
§ 371 (c)(1),
(2), (4) Date: Dec. 12, 2007

(87) PCT Pub. No.: WO2006/081258
PCT Pub. Date: Aug. 3, 2006

(65) Prior Publication Data
US 2008/0121629 A1    May 29, 2008

Related U.S. Application Data

(60) Provisional application No. 60/647,179, filed on Jan. 25, 2005.

(51) Int. Cl.
*C22C 19/05* (2006.01)
*B23K 9/23* (2006.01)

(52) U.S. Cl.
USPC .................. 420/451; 219/137 WM; 420/452

(58) Field of Classification Search
USPC ........................... 420/451, 452; 219/137 WM
See application file for complete search history.

(56) References Cited

U.S. PATENT DOCUMENTS

| | | | |
|---|---|---|---|
| 2,720,473 A * | 10/1955 | Donahey | 148/26 |
| 3,565,611 A | 2/1971 | Economy | |
| 4,400,209 A | 8/1983 | Kudo et al. | |
| 4,765,956 A | 8/1988 | Smith et al. | |
| 5,543,109 A * | 8/1996 | Senba et al. | 420/446 |
| 5,897,801 A * | 4/1999 | Smashey et al. | 219/137 WM |
| 6,242,113 B1 | 6/2001 | Kiser | |
| 2004/0062677 A1 | 4/2004 | Chabenat et al. | |

FOREIGN PATENT DOCUMENTS

| | | | |
|---|---|---|---|
| EP | 1408130 A1 | 4/2004 | |
| JP | 10277777 A | 10/1998 | |
| JP | 2001-107196 | * 4/2001 | ............. C22C 38/00 |
| JP | 2001107196 A | 4/2001 | |

OTHER PUBLICATIONS

English Translation of Hirata et al. (JP 2001-107196) (2001).*
English Abstract and English Machine Translation of Hirata et al. (JP 2001-107196) (2001).*
ANSI/AWS Spec., A5.11/A5.11M; "Specification for Nickel and Nickel-Alloy Welding Electrodes for Shielded Metal Arc Welding"; (2005).
ANSI-AWS Spec., A5.14/A5.14M; "Specification for Nickel and Nickel-Alloy Bare Welding Electrodes and Rods"; (2005).
Olson, et al., The Welding of Nickel Alloys, The ASM Handbook, vol. 6, 586-592 and 741-751, Table 1, NO6690, (Dec. 1993).
"Arc Cold Welding for Repairing Defects in Weld Deposit of High Chromium Cast Iron Alloys", Welding 1994 (2), Dec. 31, 1994.

* cited by examiner

*Primary Examiner* — Jessee Roe
(74) *Attorney, Agent, or Firm* — The Webb Law Firm

(57) ABSTRACT

A Ni—Cr—Fe alloy in the form of a weld deposit, a welding electrode and flux and a method of welding utilizing the Ni—Cr—Fe alloy. The alloy comprises in % by weight: 27-31 Cr, 6-11 Fe, 0.01-0.04 C, 1.5-4 Mn, 1-3 Nb, up to 3 Ta, 1-3 (Nb+Ta), 0.01-0.50 Ti, 0.0003-0.02 Zr, 0.0005-0.004 B, <0.50 Si, 0.50 max Al, <0.50 Cu, <1.0 W, <1.0 Mo, <0.12 Co, <0.015 S, <0.015 P, 0.01 max Mg, balance Ni plus incidental additions and impurities. The welding method includes welding using a short arc wherein the distance from the electrode tip to the weld deposit is maintained at less than 0.125 inch.

7 Claims, No Drawings

COATED WELDING ELECTRODE HAVING RESISTANCE TO DUCTILITY DIP CRACKING, AND WELD DEPOSIT PRODUCED THEREFROM

CROSS-REFERENCE TO RELATED APPLICATION

This application claims the benefit of U.S. Provisional Application No. 60/647,179 filed Jan. 25, 2005, entitled "Coated Welding Electrode Having Resistance to Ductility Dip Cracking" and is incorporated herewith in its entirety.

BACKGROUND OF THE INVENTION

1. Field of the Invention

This invention relates generally to a nickel, chromium, iron welding alloy, articles made therefrom for use in producing weldments, and weldments and methods for producing these weldments. The invention further relates to welding electrode, welding wire and flux chemical coating compositions and welding methods to obtain weld deposit compositions that are particularly resistant to ductility dip cracking, as well as being resistant to primary water stress corrosion cracking in a nuclear power generation environment.

2. Description of Related Art

In various welding applications, including equipment used in nuclear power generation, weldments are required that provide resistance to various cracking phenomenon. This includes not only stress corrosion cracking but hot cracking, cold cracking, and root cracking as well.

Commercial and military nuclear power generation has existed since the second half of the $20^{th}$ century. During this time, the industry has replaced the first generation of NiCrFe alloys having 14-15% chromium with alloys having higher chromium contents on the order of 30%. This change was predicated on the discovery that stress corrosion cracking in nuclear pure water could be avoided with alloys of this type that contained chromium in this amount. NiCrFe alloys having Cr contents on the order of 30% have now been in use for about 20-25 years.

The specific application for nuclear power generation equipment that requires the majority of welding and welded products within the nuclear power plant is the fabrication of the nuclear steam generator. This equipment is essentially a large tube and shell heat exchanger that generates steam from secondary water from primary nuclear reactor coolant. The key component of this steam generator is the tubesheet. The tubesheet is sometimes 15-20 feet in diameter and well over one foot thick and is usually forged from a high strength low alloy steel that must be weld overlaid with a NiCrFe alloy that has good fabricability and is resistant to stress corrosion cracking in nuclear pure water. Due to the size of the tubesheet, the weld deposit sustains substantial residual stress during overlay. Furthermore, the weld metal overlay must be capable of being rewelded after being drilled to provide openings therein to receive thousands of small steam generator tubes. These tubes must be seal-welded to the overlay weld deposit to make helium-leak-tight welds. These welds must be of extraordinary high quality and must provide 30-50 year life with high predictability. In addition, in both the overlay weld deposit and the welded steam generator tubes, excellent crack resistance must be provided. This requirement, with respect to resistance to hot cracking, also termed "solidification cracking," and stress corrosion cracking has been met by most of the existing 30% chromium weldments.

In addition to hot cracking resistance and stress corrosion cracking resistance, the tube-to-tubesheet welds require root cracking resistance. The tube-to-tubesheet weld is made by melting the tube end together with a ring of the weld overlay material surrounding the tube (with or without the use of additional filler metal) to thereby seal the space between the tube wall and the opening in the tubesheet. There is a tendency for these welds to crack at the bottom of the weld at the interface of the tube to the tubesheet. This type of cracking is referred to as "root cracking" because it occurs at the root of the weld. The existing 30% chromium welding alloys are not resistant to root cracking.

A third type of cracking that may be encountered is cold cracking, also known as "ductility dip cracking" or "DDC". This cracking only occurs in the solidified state after weld solidification has been completed. After solidification occurs, shrinkage stresses begin to develop as a result of the reduction in volume of the welding alloy at lower temperature. At the same time, once solidification is complete, ductility recovery occurs rapidly for a few hundred degrees, followed by a sharp temporary loss in ductility, and again followed by a more gradual continuous recovery of ductility until ambient temperature is reached. If the residual stress of cool-down is sufficiently large when the alloy exhibits this sharp ductility loss, solid state cracking (DDC) may occur. This results from portions of the microstructure not having sufficient strength or ductility to resist the stress at the prevailing temperature. The commercially available 30% chromium welding alloys presently available are not sufficiently resistant to DDC.

Ductility Dip Cracking (DDC)/cold cracking has become a topic of interest over the past ten years in the fully austenitic nickel-chromium-iron alloys and welding products used in the nuclear industry. The scientific community has learned that NiCrFe alloys with approximately 30% Cr exhibit resistance to primary water stress corrosion cracking (PWSCC) in the nuclear environment. However, the higher Cr levels, coupled with reduced Nb, tend to give weld deposits that solidify epitaxially with long straight dendrite boundaries. These boundaries, when subjected to high strain and elevated temperatures, are particularly susceptible to DDC. The phenomenon seems to be more prevalent in the 30% Cr-containing nickel alloys such as Inconel alloy 690 and welding products of the AWS class NiCrFe-7. The tendency for DDC cracking has been addressed by the invention of Inconel Filler Metal 52M and Weld Strip 52M (AWS class NiCrFe-7A-UNS3N06054). These products are covered by the present inventor's invention disclosed in U.S. Pat. No. 6,242,113, the contents of which are incorporated by reference herein in their entirety. The solution for DDC/cold cracking in flux coated electrodes is specifically addressed by the present application.

Also of interest as background information are the various specifications of the American Welding Society ("AWS") and American National Standards Institute ("ANSI"), namely, ANSI/AWS Specification A5.11/A5.11M:2005, entitled "Specification for Nickel and Nickel-Alloy Welding Electrodes for Shielded Metal Arc Welding" and ANSI/AWS Specification A5.14/A5.14M:2005, entitled "Specification for Nickel and Nickel-Alloy Bare Welding Electrodes and Rods". Both of these specifications are incorporated by reference in their entireties herein.

SUMMARY OF THE INVENTION

It is an object of the present invention to provide a nickel, chromium, iron welding alloy, weldments made therefrom, and welding methods that provide the desired strength and corrosion resistance in addition to resistance to hot cracking, DDC/cold cracking, root cracking, as well as stress corrosion cracking.

A further object of the invention is to provide a welding alloy of the nickel, chromium, iron type with a flux coating that is particularly adapted for uses in fabricating equipment used in nuclear power generation.

In accordance with the invention, there is provided a nickel, chromium, iron alloy for use in producing weld deposits. The alloy comprises, in weight percent, about 27-31% chromium; about 6-11% iron; about 0.01-0.04% carbon; about 1.5-4% manganese; about 1-3% niobium plus tantalum; less than 0.75% silicon; about 0.01-0.50% titanium; 0.50% max aluminum; less than 0.50 copper; less than 1.0% tungsten; less than 1.0% molybdenum; less than 0.12% cobalt; about 0.0003-0.02% zirconium; less than about 0.015% sulfur; about 0.0005-0.004% boron; less than about 0.02% phosphorous; up to about 0.02 magnesium; and balance nickel (preferably at a minimum of 48% Ni), and incidental impurities.

The alloy will exhibit adequate stress corrosion cracking resistance in view of the chromium content. The alloy may be in the form of a weld deposit, a flux covered welding electrode, a welding electrode in the form of a wire with a flux cover, a welding electrode in the form of a sheath with a flux core, a weld deposit overlay or a weldment comprising an alloy substrate, such as steel with an overlay of the invention alloy. It may be used in a method for producing a weld deposit or weldment in the form of a flux-covered electrode used for producing a weld deposit. The method for producing the weld deposit may include producing a flux-covered electrode of a nickel, chromium wire, or a nickel, chromium, iron wire and melting the electrode using a "short arc" to produce a weld deposit while retaining desired levels of boron, zirconium and magnesium as a result of the interaction between the flux coating and the weld deposit. A short arc is defined as the distance from the electrode tip to the weld deposit and is less than 0.125 inch and preferably between about 0.020 to 0.040 inch. The ratio of Nb:Si in the weld deposit is desirably maintained between about 5:1 to 7:1 for good cracking resistance in the weld deposit. The manufacture of flux coatings for welding electrodes is, in itself, well known in the art and need not be described in detail herein. The flux coating of the invention contains fluorides, oxides, carbonates and a mixture of selected intermetallics as mentioned herein.

To summarize, the present invention is directed to a Ni—Cr—Fe alloy comprising in % by weight: 27-31 Cr, 6-11 Fe, 0.01-0.04 C, 1.5-4 Mn, 1-3 Nb, up to 3 Ta, 1-3 (Nb+Ta), 0.10-0.50 Ti, 0.0003-0.02 Zr, 0.0005-0.004 B, <0.50 Si, 0.20 max Al, <0.20 Cu, <1.0 W, <1.0 Mo, <0.12 Co, <0.015 S, <0.015 P, 0.01 max Mg, balance Ni plus incidental additions and impurities. The alloy preferably contains a minimum of 48% Ni. More preferably, the alloy contains 29-31 Cr, 6.5-9 Fe, 0.0007-0.004 B, 2.5-3.5 Mn, 0.003-0.01 Zr and 50 min. Ni.

The invention also includes an undiluted Ni—Cr—Fe alloy weld deposit comprising in % by weight: 27-31 Cr, 6-11 Fe, 0.01-0.04 C, 1.5-4 Mn, 1-3 Nb, up to 3 Ta, 1-3 (Nb+Ta), 0.10-0.50 Ti, 0.0003-0.02 Zr, 0.0005-0.004 B, <0.50 Si, 0.20 max Al, <0.20 Cu, <1.0 W, <1.0 Mo, <0.12 Co, <0.015 S, <0.015 P, 0.004-0.01 Mg, balance Ni plus incidental additions and impurities. The weld deposit preferably contains a minimum of 50 Ni. The weld deposit also preferably contains 0.0007-0.003 B and 0.001-0.01 Zr and 50 min Ni. Still further, the weld deposit contains 0.0005-0.002 B, 0.001-0.01 Zr and 50 min Ni.

A presently preferred method for producing a weld deposit according to the invention comprises the steps of providing a flux-covered electrode of a Ni—Cr—Fe or a Ni—Cr—Fe wire with a flux associated therewith and melting said electrode or wire in a welding step using a short arc technique wherein a tip of the electrode or wire is spaced less than 0.125 inch from the weld deposit to produce a weld deposit comprising in % by weight: 27-31 Cr, 6-11 Fe, 0.01-0.04 C, 1.5-4 Mn, 1-3 Nb, up to 3 Ta, 1-3 (Nb+Ta), 0.01-0.50 Ti, 0.0003-0.02 Zr, 0.0005-0.004 B, <0.50 Si, 0.50 max Al, <0.50 Cu, <1.0 W, <1.0 Mo, <0.12 Co, <0.015 S, <0.015 P, 0.004-0.01 Mg, balance Ni plus incidental additions and impurities. The space between the tip of the electrode or wire and the weld deposit is preferably 0.02 to 0.04 inch. The welding step of the invention is preferably conducted using a shielded metal arc process. In the present method, the flux preferably comprises a mixture of one or more of Ni, Mg, and Si and produces a weld deposit wherein a Nb:Si weight ratio is between 5:1 to 7:1.

DETAILED DESCRIPTION OF THE INVENTION

The NiCrFe welding alloy in accordance with the invention has sufficient nickel plus chromium along with considerably tight control of secondary chemical constituents, as well as trace elements, to provide suitable corrosion resistance in addition to excellent stress corrosion cracking resistance. In addition, the alloy must be resistant to solidification cracking, to root cracking, and to cold cracking under reheat conditions.

To confer resistance to solidification cracking, the alloy should have adequate solubility for its alloying elements and a narrow liquidus to solidus temperature range. Also, it should have low levels of sulfur, phosphorus, and other low-melting elements and it should contain minimum levels of elements that form low-melting point phases in the alloy.

The resistance to cold cracking is controlled by increasing the high-temperature strength and ductility at the grain boundaries. This is accomplished by the careful combination of niobium, zirconium and boron in accordance with the limits of the invention. Niobium is required to be restricted to avoid the formation of secondary phases while contributing to grain boundary strength in the solid state. Niobium is also required for resistance to stress corrosion cracking. Boron contributes to grain boundary strength and improves hot ductility, but at higher levels than in accordance with the invention is detrimental to hot cracking resistance. Zirconium improves solid state strength and ductility at the grain boundaries and improves the oxidation resistance at the grain boundaries. At higher levels than in accordance with the invention, zirconium contributes to hot cracking. At boron and zirconium levels lower than in accordance with the invention, there is relatively little resistance to cold cracking. As boron alone is added, there appears to be very slight improvement to cold cracking resistance, but with boron in conjunction with zirconium at levels in accordance with the invention, cold cracking is substantially eliminated.

Those skilled in the art of nickel alloy welding readily appreciate that the demand for quality in welds destined for nuclear service includes resistance to hot cracking, cold cracking, bend cracking, root cracking and crater cracking. Existing products of the NiCrFe-7 classification currently offer varying levels of resistance to most of these types of cracking but remain prone to DDC. The instant invention is designed to provide a remedy for DDC and improved resistance to crater cracking that provides the ability to weld with the shielded metal arc process (SMAW). Ductility Dip Cracking is a phenomena characterized by grain boundary cracking which occurs in the solid state at temperatures well below the solidus of fully austenitic NiCrFe alloys and welds. It is thought to be related to high temperature creep phenomena and, as such, small amounts of boron and zirconium are added to improve grain boundary strength and ductility. The tests used to evaluate the above types of cracking are:

(1) Liquid Penetrant Testing of weld overlay deposits to evaluate hot cracking and crater cracking;

(2) A series of drilled holes in the overlay with simulated tube to tube sheet welds and repairs are sectioned, etched, and evaluated at 60× to check for DDC and any further signs of hot cracking;

(3) To evaluate root cracking, a solid plate of Inconel Alloy 690 is welded along one side of the weld overlay with a standing edge weld to simulate tube to tube sheet welds. This weld is sectioned, polished, etched, and observed at 60× at various locations along its length to check for root cracking tendency;

(4) Standard ⅜ inch thick transverse side bends are also cut from the weld overlay and are bent 180° around a 2T mandrel. The outer surface of the bend which has been elongated approximately 20% is then examined for bend cracks or "fissures" with the number of fissures and size of fissures being recorded per bend.

A series of weld deposit chemistries are shown in Table 1 below. Each weld deposit chemistry is comprised of approximately 30% Cr, 58% Ni, 8% Fe with varying amounts of Nb, Mn, and other minor elements. An abbreviated reporting of the foregoing tests is tabulated just below each composition in the table. The table and results are somewhat self-explanatory, but examination of boron and zirconium vs. DDC or cold cracking reveals that without either or without both, cold cracking occurs with regularity while with boron contents of about 0.0005% to 0.004% and zirconium of about 0.0003% to 0.02%, cold cracking is avoided. It will also be noted that with sufficient levels of Nb and Mn coupled with proper control of other minor elements, hot cracking is avoided. An additional advantage of boron and zirconium additions with improved Nb and Mn levels is that Al levels may be reduced, which improves crater cracking resistance. Examination of Table 1 in the designations of Lot Nos. 83F8 short arc and 76F9HTG will show the optimum chemical compositions of electrode deposits for maximum quality weld deposits. The undiluted chemistry as deposited by the SMAW process in accordance with the present invention is as follows: preferably 48% minimum Ni; 27% to 31% Cr; 6% to 11% Fe; 1% to 3% Nb; 1.5% to 4% Mn; 0.01 to 0.04% C; 0.005 to 0.01 Mg; less than 0.015% S; less than 0.015% P; 0.0005 to 0.004% B; 0.0003% to 0.02% Zr; 0.01% to 0.50% Ti; and 0.50% max Al. Among other functions, both Nb and Ta form primary (from the melt) carbides that tend to control grain size and pin grain boundaries during solidification and cool-down such that greater tortuosity is created in the grain boundaries. Tortuous grain boundaries are beneficial in reducing the tendency for DDC (ductility dip cracking) during welding. The AWS specifications cited herein contain the column entitled Nb+Ta. Historically, these elements have been listed together because they occur together in the earth's crust naturally, and prior to the surge in electronics use, extreme efforts were not expended to extract all the Ta from Nb. Because they occur together and behave similarly, they are listed together. Both have very high melting temperatures, but niobium is about half as dense as tantalum. Both have body centered cubic crystalline structures and both have identical lattice parameters (closest approach of atoms). Thus, the practical upshot of these observations is that due to the extremely high cost of tantalum, it is not used frequently as an addition along with niobium. Niobium is about half as dense as tantalum. This results in Ta being about half as effective as niobium in the role of carbide former. While Ta may be a more aggressive carbide former, it would require twice as much in weight % to provide the same number of atoms as niobium.

Typical mechanical properties achieved with this weld deposit material of the invention, designated "152M", are:

| 152M - Mechanical Properties | | | | |
|---|---|---|---|---|
| Hardness | TS | 0.2% YS | % Elongation | % Red. Area |
| 90 $R_B$ | 96 ksi | 60 ksi | 35% | 45% |

TABLE 1

| INCONEL CF152 Vectors | | | | | | | | | | |
|---|---|---|---|---|---|---|---|---|---|---|
| ELEMENT | 1005htg | 1008htg | 1011htg | Core Wire Y9570 | 1018htg | 1022htg | 1023htg | 1024htg | 1038htg | 152 36F7 |
| C | 0.03 | 0.05 | 0.04 | 0.02 | 0.033 | 0.051 | 0.053 | 0.04 | 0.06 | 0.04 |
| Mn | 1 | 0.96 | 0.63 | 0.92 | 0.84 | 2.11 | 3.64 | 4.58 | 3.32 | 3.19 |
| Fe | 9.29 | 9.76 | 12.86 | 8.5 | 9.77 | 13.25 | 14.27 | 9.59 | 14.91 | 10.88 |
| S | 0.006 | 0.006 | 0.005 | 0.001 | 0.0054 | 0.0044 | 0.0039 | 0.004 | 0.006 | 0.003 |
| Si | 0.37 | 0.73 | 0.45 | 0.03 | 0.23 | 0.29 | 0.3 | 0.28 | 0.3 | 0.34 |
| Cu | 0.07 | 0.08 | 0.01 | 0.03 | 0.067 | 0.06 | 0.06 | 0.07 | 0.07 | 0.02 |
| Ni | 56.17 | 55.76 | 54.69 | 60.1 | 57.36 | 53.24 | 51.47 | 53.78 | 51.7 | 54.9 |
| Cr | 31.47 | 31.1 | 30.22 | 30.13 | 30.25 | 29.23 | 28.43 | 29.53 | 27.72 | 28.9 |
| Al | 0.08 | 0.05 | 0.22 | 0.08 | 0.02 | 0.03 | 0.03 | 0.03 | 0.07 | 0.04 |
| Ti | 0.09 | 0.1 | 0.13 | 0.22 | 0.01 | 0.04 | 0.04 | 0.04 | 0.09 | 0.07 |
| Mg | <0.001 | <0.001 | <0.001 | <0.001 | <0.001 | <0.001 | <0.001 | <0.001 | 0.003 | <0.001 |
| Co | 0.01 | 0.01 | 0.01 | 0.103 | 0.011 | 0.006 | 0.006 | 0.01 | 0.02 | 0.005 |
| Nb | 1.32 | 1.31 | 0.67 | 0.92 | 1.33 | 1.6 | 1.62 | 1.96 | 1.5 | 1.53 |
| P | 0.005 | 0.005 | 0.004 | 0.003 | 0.005 | 0.006 | 0.007 | 0.007 | 0.008 | 0.004 |
| Zr | 0.002 | 0.002 | 0.0001 | 0.006 | 0.0016 | 0.009 | 0.01 | 0.009 | 0.013 | <0.001 |
| B | 0.0011 | 0.0013 | 0.0035 | 0.004 | 0.001 | 0.0012 | 0.0015 | 0.0012 | 0.0014 | <0.001 |
| SB1 | 0 | 11 | 1⅛, 11½2 | | 0 | 0 | 0 | 0 | 0 | 3 < .015 |
| SB2 | 1 < 1/16 | 12 | 1 1/16, 6 1/32 | | 0 | 0 | 0 | 0 | 0 | 5 < .015 |
| SBTOTAL | 0.06 | 0.69 | 0.695 | | 0 | 0 | 0 | 0 | 0 | <.12 |
| TS | 18 | 26 | 42 | | 33 | 3 | 0 | 11 | 3 | 12 |
| RC1 | 0 | 0 | 0 | | 0 | 0 | 0 | 0 | 0 | No test |
| RC2 | 0 | 0 | 0 | | 0 | 0 | 0 | 0 | 0 | No test |
| NB/SI | 3.6 | 1.8 | 1.5 | | 5.78 | 5.52 | 5.4 | 6.45 | 5 | 4.5 |

TABLE 1-continued

INCONEL CF152 Vectors

| ZR/S | 0.333333 | 0.333333 | 0.02 | | 0.296296 | 2.045455 | 2.564103 | 2.25 | 2.166667 5 NM |
|---|---|---|---|---|---|---|---|---|---|
| ELEMENT | 1040htg | Short Arc 9" 83F6 152M3/32 | Long Arc 9" 83F6 152M3/32 | Long Arc 12" 83FS 152M3/32 | Short Arc 83F7 152M1/8 | Long Arc 83F7 152M1/8 | Short Arc 83F8 152M5/32 | Long Arc 83F8 152M5/32 | HTG 76F9 152M1/8 |
| C | 0.07 | 0.04 | 0.029 | 0.027 | 0.04 | 0.019 | 0.03 | 0.005 | 0.04 |
| Mn | 3.1 | 3.45 | 3.25 | 3.21 | 3.3 | 3.02 | 3.16 | 2.98 | 4.36 |
| Fe | 25.77 | 8.84 | 8.75 | 8.68 | 8.76 | 8.75 | 8.75 | 8.66 | 8.92 |
| S | 0.006 | 0.006 | 0.004 | 0.004 | 0.005 | 0.004 | 0.008 | 0.002 | 0.003 |
| Si | 0.3 | 0.32 | 0.33 | 0.33 | 0.3 | 0.27 | 0.3 | 0.22 | 0.34 |
| Cu | 0.1 | 0.04 | 0.005 | 0.005 | 0.04 | 0.005 | 0.04 | 0.005 | 0.05 |
| Ni | 44.93 | 57.08 | 57 | 56.8 | 57.17 | 56.5 | 57.2 | 56.7 | 55.46 |
| Cr | 24.07 | 28.38 | 28.98 | 29.22 | 28.54 | 30.13 | 28.68 | 30.23 | 28.46 |
| Al | 0.01 | 0.04 | 0.005 | 0.007 | 0.04 | 0.005 | 0.04 | 0.005 | 0.03 |
| Ti | 0.06 | 0.04 | 0.04 | 0.05 | 0.06 | 0.04 | 0.07 | 0.03 | 0.06 |
| Mg | 0.003 | 0.005 | <0.001 | <0.001 | 0.005 | <0.001 | 0.006 | <0.001 | 0.006 |
| Co | 0.02 | 0.1 | 0.01 | 0.01 | 0.1 | 0.006 | 0.1 | 0.005 | 0.09 |
| Nb | 1.35 | 1.59 | 1.53 | 1.64 | 1.57 | 1.27 | 1.53 | 1.17 | 2.12 |
| P | 0.009 | 0.008 | 0.001 | 0.001 | 0.009 | 0.001 | 0.008 | 0.001 | 0.008 |
| Zr | 0.01 | 0.003 | 0.0004 | 0.0005 | 0.003 | 0.0006 | 0.003 | 0.0004 | 0.003 |
| B | <.001 | 0.002 | 0.0007 | 0.0007 | 0.002 | 0.0008 | 0.002 | 0.0008 | 0.001 |
| SB1 | 0 | | | 0 | 2 < 1/32 | 0 | 2 < 1/32 | 0 | 0 |
| SB2 | 0 | | | 0 | 0 | 0 | 0 | 0 | 0 |
| SBTOTAL | 0 | | | 0 | <0.062 | 0 | <0.062 | 0 | 0 |
| TS | 14 | No Test | No Test | No Test | 2 | 9 | 1 | 23 | 0 |
| RC1 | 0 | No Test | No Test | No Test | No Test | 0 | No Test | 0 | No Test |
| RC2 | 0 | No Test | No Test | No Test | No Test | 0 | No Test | 0 | No Test |
| NB/SI | 4.5 | 4.96875 | 4.636364 | 4.969697 | 5.233333 | 4.703704 | 5.1 | 5.318182 | 6.235294 |
| ZR/S | 1.666667 | 0.5 7.5 NM | 0.1 7.5 NM | 0.125 | 0.6 | 0.15 | 0.375 | 0.2 | 1 |

In summary, it is possible to obtain the stress corrosion cracking resistant benefits of nickel plus 30% Cr without suffering the detriment of DDC by using the instant invention. The alloy's composition has been balanced to minimize porosity and cracking of all types and the flux covering composition is designed for maximum operator appeal and out-of-position capability for 3/32 and 1/8 inch diameter electrodes.

The development of the electrode is different than that of the present inventor's prior U.S. Pat. No. 6,242,113 (INCONEL WE 52M) due to the use of flux chemicals and silicate binders in the electrode coating. The use of sodium and sometimes potassium silicate binders typically increases the amount of silicon in the weld deposit, which tends to increase the cracking tendency. The counter measure for silicon is additional niobium. For nickel-chromium type alloys, it is preferable to employ about a 5:1 to a 7:1 ratio of Nb:Si for good cracking resistance. The second-from-bottom line of data reported in Table 1 has a calculated Nb:Si ratio for the various candidate alloys. The next six lines up from the bottom are various quality test results: SB=side bends with SB1 and SB2 being the actual bend specimen and followed by number of fissures and sometimes individual lengths of fissures. SB total is given in inches and is the total sum of fissure lengths in both side bends. TS=tube sheet. These are the simulated tubesheet welds which were performed as follows: First, deposit a weld metal overlay of the material to be tested, drill simulated tubesheet holes (but without the tubes), then perform GTAW welds around the tops of the holes to simulate tube to tubesheet welds. Next, the plate is sectioned through the centerlines of the holes to expose cross-sections of the simulated welds. The samples are polished, etched and examined at 60× to look for cracking. TS cracks are interpreted to be DDC/cold cracks (ductility dip cracks). While all of the cracks do not exhibit classical indications of DDC, most of them do and are believed to be DDC at the lowest possible strain to cause DDC. RC1 and RC2 are a measure of the tendency for root cracking in tube to tubesheet welds.

The next sixteen lines up in Table 1 are the chemical analyses for the various coated electrode weld deposit examples for the various coated electrode weld deposit examples. The study began with the aim of achieving the above-mentioned Nb:Si ratio because of the elevated silicon contents normally experienced in coated electrode (SMAW) welding. Earlier in the study, various ways of introducing B and Zr into the deposits were examined and it was determined that it was virtually impossible to control the small amounts necessary to be effective by using flux coating additions. Therefore, the present study was initiated using a bare core wire (designated Y9570 in Table 1) with B (0.004%) and Zr (0.006%) in the core wire. The basic study was begun by making the flux coated electrodes and then assessing the tendency for cracking. The examples designated 1005, 1008, 1011, and 1018 are early examples of coated electrodes that contained no B, Zr, or Mg in the deposit. It is believed from experience that the B and Zr additions in the core wire are stripped out of the deposit which occurs by simple oxidation during the welding process. With example 1018, nickel magnesium additions were made to the flux coating and with examples 1022, 1023, and 1024, the nickel zirconium additions were evaluated. It was fortuitous to have no TS cracking with example 1023 in spite of the absence of magnesium. Nickel magnesium and nickel zirconium were present in the flux coating in examples 1018 through 1024 because magnesium and zirconium are both known to be very strong deoxidizers. They are added as alloys of nickel to preserve their deoxidizing potential during deployment. In spite of the NiMg addition to example 1018, no Mg was seen in the weld deposit analysis. This is likely due to the lack of using a "short arc" length technique (which was learned later). A modest increase in the Zr deposits is noted for examples 1022, 1023, and 1024 up to about 0.009 to 0.01%; however, cracking continued in the TS (DDC) category. Nickel magnesium flux content was increased in example 1038 to 5% and in example 1040 to 7.5% which were rewarded by 0.003% being retained in the weld deposits. With these samples, it was found that only example 1023 with B=0.0015% and Zr=0.01% and 1038 with B=0.0014% and Zr=0.013% had good results for TS (0 and 3 respectively). Based on these results, it was decided to produce "pilot" production runs of several diameters. Initially, 76F9 was made using 7.5% NiMg in the flux and there were no TS cracks while retaining Mg=0.006%, Zr=0.003% and B=0.001% in the deposit which was a favorable result. Additional lot numbers 83F5, 83F6, 83F7, and 83F8 were then made, all with the same wet mix of flux that contained 7.5% NiMg. After extruding and baking the flux-coated electrodes, tests were conducted and it was very surprising that 9 TS cracks were found in 83F7 and 23 TS cracks in 83F8. After chemical analyses were determined, it was further unexpected that no B, Zr, or Mg was retained in the weld deposits. The test runs were re-evaluated and the importance of maintaining a short arc length during welding was discovered. It was concluded that this short arc technique helped to protect the deoxidizers in the products and allowed the retention of Mg, B, and Zr in the deposits. Observe 83F8 with a short arc vs. 83F8 with a long arc, and compare TS cracks of 23 with a long arc and 1 with a short arc. Likewise, compare 83F7 with long vs. short arc and find the TS cracks to be 9 for the long arc vs. 2 for the short arc. Also note that the B, Zr, and Mg retained in the deposits are in the desired ranges.

A "short arc" is defined as the distance between the electrode tip and the weld deposit and is less than 0.125 inch and preferably between about 0.020 to 0.040 inch. A "long arc" is greater than 0.125 inch.

Thus, by controlling the preferred Nb:Si ratio between about 5:1 to 7:1 in the deposit and by using a short arc welding technique, the desired B, Zr, and Mg analysis in the weld deposit was achieved.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A welding electrode comprising: (i) a core comprising in % by weight: 27-31 Cr, 6-11 Fe, 0.01-0.04 C, 1.5-4 Mn, 1-3 Nb, up to 3 Ta, 1-3 (Nb+Ta), 0.01-0.50 Ti, 0.0003-0.02 Zr, 0.0005-0.004 B, <0.50 Si, 0.50 max Al, <0.50 Cu, <1.0 W, <1.0 Mo, <0.12 Co, <0.015 S, <0.015 P, 0.01 max Mg, balance Ni, and (ii) a flux covering comprising nickel magnesium, nickel zirconium, or both, wherein an undiluted weld metal deposit produced using said welding alloy comprises in % by weight 0.0003-0.02 Zr, 0.0005-0.004 B and 0.004-0.01 Mg.

2. The welding electrode of claim 1 wherein a minimum of 48% Ni is present in the core.

3. The welding electrode of claim 1 wherein the core comprises in % by weight: 29-31 Cr, 6.5-9 Fe, 0.0005-0.004 B, 2.5-3.5 Mn, 0.0005-0.01 Zr and 50 min Ni.

4. The welding electrode according to claim 1 wherein an undiluted weld deposit produced using the welding electrode comprises in % by weight: 27-31 Cr, 6-11 Fe, 0.01-0.04 C, 1.5-4 Mn, 1-3 Nb, up to 3 Ta, 1-3 (Nb+Ta), 0.01-0.50 Ti, 0.0003-0.02 Zr, 0.0005-0.004 B, <0.50 Si, 0.50 max Al, <0.50 Cu, <1.0 W, <1.0 Mo, <0.12 Co, <0.015 S, <0.015 P, 0.004-0.01 Mg, balance Ni.

5. The welding electrode according to claim 4 wherein the undiluted weld deposit comprises 0.0005-0.002% B, 0.001-0.01% Zr and 50% min Ni.

6. The welding electrode according to claim 4 wherein the undiluted weld deposit comprises a minimum of 50% Ni.

7. The welding electrode according to claim 6 wherein the undiluted weld deposit comprises 0.0007-0.003% B and 0.001-0.01% Zr.

* * * * *

UNITED STATES PATENT AND TRADEMARK OFFICE
CERTIFICATE OF CORRECTION

PATENT NO.        : 8,603,389 B2                                              Page 1 of 1
APPLICATION NO.   : 11/814244
DATED             : December 10, 2013
INVENTOR(S)       : Samuel D. Kiser It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1429 days.

Signed and Sealed this
Twenty-second Day of September, 2015

Michelle K. Lee
*Director of the United States Patent and Trademark Office*